UNITED STATES PATENT OFFICE.

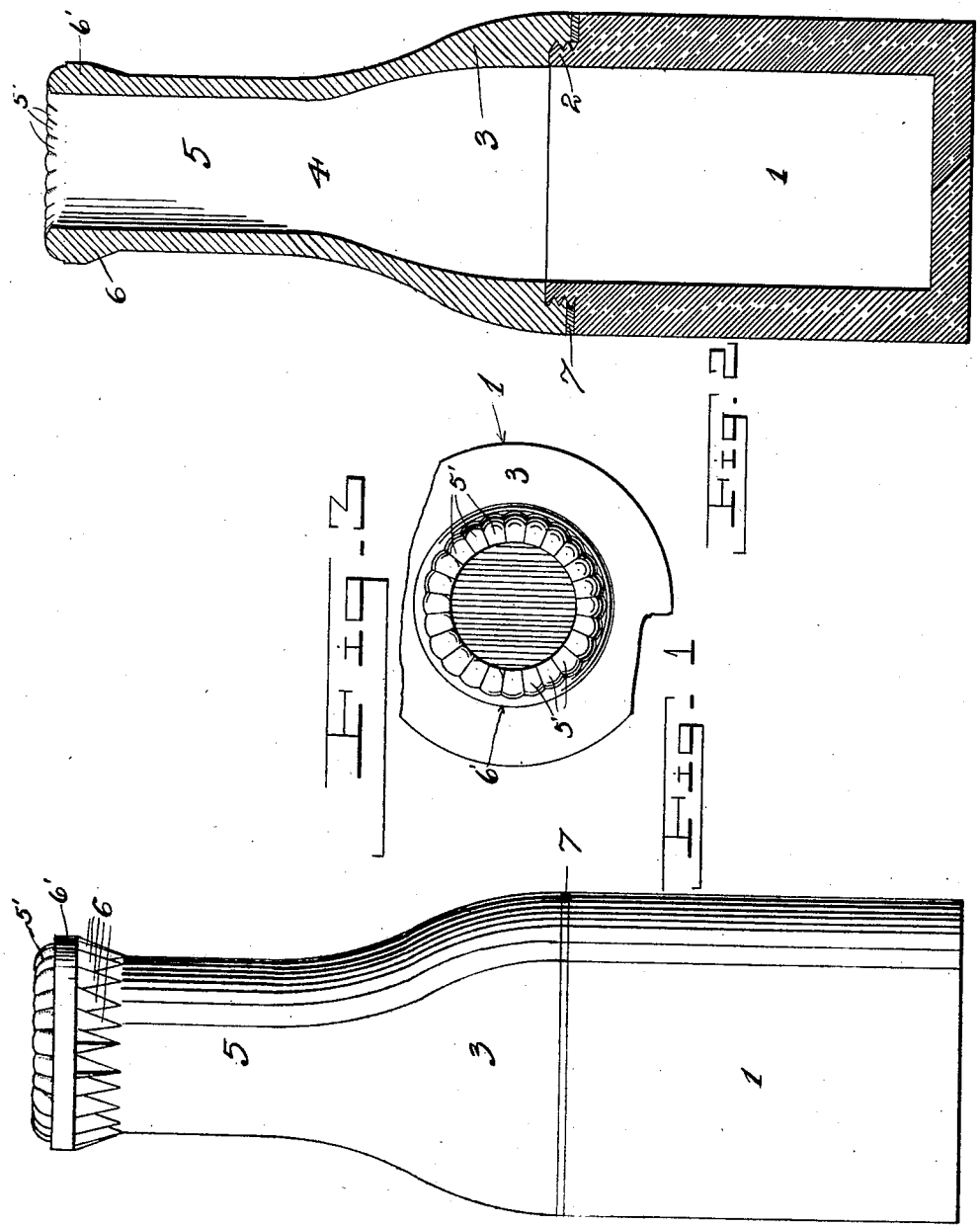

JAMES BRAMBLE MOONEY, OF COLDWATER, KANSAS.

DRENCHING-BOTTLE.

1,077,541. Specification of Letters Patent. Patented Nov. 4, 1913.

Application filed December 18, 1911. Serial No. 666,402.

*To all whom it may concern:*

Be it known that I, JAMES BRAMBLE MOONEY, a citizen of the United States, residing at Coldwater, in the county of Comanche and State of Kansas, have invented certain new and useful Improvements in Drenching-Bottles, of which the following is a specification.

My invention relates to improvements in drenching bottles, and has for its leading object the provision of an improved form of drenching bottle which may be employed in dosing an animal without danger of breaking of the bottle and thus of injury either to the animal or the person dosing the same.

The further object of my invention is the provision of an improved durable drenching bottle which shall have the neck thereof so constructed as to tend to stimulate the nerves of the animal in such manner as to cause the animal to readily swallow the medicine being poured from the bottle into its mouth.

Other objects and advantages of my improved drenching bottle will be readily apparent by reference to the following description taken in connection with the accompanying drawings, and it will be understood that I may make any modifications in the specific structure shown and described within the scope of my claim without departing from or exceeding the spirit of my invention.

Figure 1 represents a side elevation of my improved bottle. Fig. 2 represents a vertical sectional view thereof, and Fig. 3 represents a fragmentary top plan view of the same.

In the drawings, the numeral 1 designates the base of my bottle which is formed of heavy glass and has the reduced threaded male portion 2 adapted to fit into the interiorly threaded bell 3 of the upper metallic section 4 of my improved drenching bottle. Said upper section 4 has a reduced neck 5 for discharging the contents of the bottle, the neck 5 being formed with tapering ribs or corrugations 6 adjacent the discharge mouth thereof. The neck is further provided with a series of beads 5′, the same being separated from the corrugations 6 by an annular flange 6′.

In order to insure a tight non-leaking joint between the sections 1 and 4, I preferably interpose between the shoulder of the base 1 and the lower edge of the bell 3 the gasket or rubber ring 7 similar to a fruit jar ring, while the threads 2 may be treated with white lead, cement or other suitable substance to aid in making a water tight joint between the two sections of the bottle.

The object of the beads 5′ and corrugations 6 at the upper end of the neck is to slightly irritate the tongue of an animal when my device is placed in its mouth. This irritation is caused by the ribs merely resting on the tongue of the animal or accentuated by slightly twisting the bottle and will tend to cause the animal to swallow and will consequently facilitate the pouring of medicine from the bottle.

From the foregoing description taken in connection with the accompanying drawings, the construction of my improved drenching bottle will be readily understood and it will be seen that I have provided an improved bottle of this character in which the upper portion is formed of a metal which will prevent breakage in the event of the animal's closing its mouth thereon and which neck is formed with portions for causing a slight irritation of the tongue of the animal to stimulate the desire to swallow and thus increase the efficiency of my bottle.

I claim:

A drenching bottle comprising a transparent base portion, and a metal upper section, said upper section having a reduced neck, an annular flange formed upon said neck, an annular series of downwardly tapered corrugations formed integral with the flange and neck, and below the former, and a circular series of beads formed integral with the upper surface of the flange and upper edge of the neck.

In testimony whereof I affix my signature, in the presence of two witnesses.

JAMES BRAMBLE MOONEY.

Witnesses:
N. A. LYTLE,
EMERY R. RAY.